July 7, 1970  D. H. ROBBINS  3,519,346

METHOD OF PRODUCING PHOTOGRAPHIC NEGATIVES AND PRINTS

Filed May 28, 1968

INVENTOR
DANIEL H. ROBBINS
BY
ATTORNEY 3,519,346
METHOD OF PRODUCING PHOTOGRAPHIC NEGATIVES AND PRINTS
Daniel H. Robbins, Rochester, N.Y., assignor to Itek Corporation, Lexington, Mass., a corporation of Delaware
Filed May 28, 1968, Ser. No. 732,739
Int. Cl. G03b 27/32
U.S. Cl. 355—77                                     10 Claims

ABSTRACT OF THE DISCLOSURE

A method for preparing photographic negatives having a greater compensating density at the center than at the periphery is accomplished by illuminating a subject at least as intensely at the center than along the periphery. When the image is projected through a lens exhibiting off-axis light intensity losses resulting from the $\cos^4$ law, the resulting print is of uniform density.

BACKGROUND OF THE INVENTION

Field of the invention

The invention is directed toward a method of preparing photographic images, usually photographic negatives, for use in optical and photographic systems having appreciable off-axis light intensity losses. Those losses are primarily attributable to the well known $\cos^4$ law which holds that the intensity of the image of an object off the axis of the lens is decreased by a function of the $\cos^4$ of the angle of the object from the lens axis. This problem is of particular concern in the utilization of copyboards for copying cameras and printers where wide angle optical systems are used to capture a large subject field on a small negative and to reproduce subjects in a wide angle format from small negatives.

Description of the prior art

Lighting methods intended to correct the problems engendered by the $\cos^4$ law are known in the prior art. However, the solution which has been consistently employed in the past involves lighting the subject more brightly at the periphery than in the center. See, for example, U.S. Pat. 3,375,752 entitled "Copyboard Lighting System." This form of lighting produces a negative or positive which has approximately a uniform density throughout for equal exposure time since the fall off characteristics of the lens are compensated for by the more intense off-axis illumination of the object.

However, when negatives of this type are used to produce a blowback print, the $\cos^4$ law characteristics of the projection lens often result in details fading at the edges of the print due to under exposure. This is particularly true when photosensitive papers having a high exposure threshold are used. Fine or light lines and printing which are present, for example, in outer portions of microfilm engineering drawings are often lost when reproduced from a uniform negative, due to the fall off characteristics of the projection lens used for blowback. Additional fall off may also be encountered when using illuminating systems containing condenser lenses and the like.

SUMMARY OF THE INVENTION

It has been found that blowback prints of uniform density and detail may be expeditiously prepared from photographic images, preferably photographic negatives, which have a greater density at their center than at their periphery. These negatives may be prepared by illuminating a subject such as an engineering drawing either more intensely at the center than at the periphery or optionally by uniform lighting. The method of the invention is particularly suitable for use when a camera is used with a wide angle objective lens, i.e., one with a 40° or more field which approximates the field of the intended projection lens. An image of the subject is projected onto a negative photosensitive material and then processed to a completed negative by means well known in the art.

When such a finished negative is projected through a lens having recognizable $\cos^4$ law fall off, the decreased off-axis intensity is compensated for by increased transmittance through the less dense periphery of the negative. Thus a positive photosensitive material may be exposed in this manner and then processed to a completed photographic print.

DESCRIPTION OF THE DRAWINGS

The invention will be more fully understood from the following description of a specific embodiment thereof taken with the drawings in which.

DESCRIPTION OF THE PREFERRED EMBODIMENT

Figure 1A:
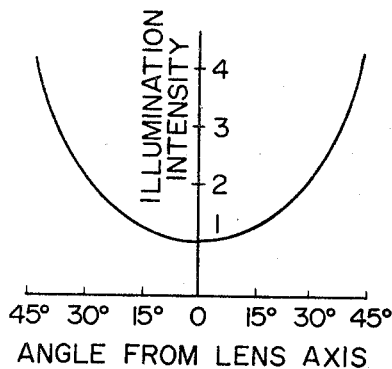
FIGS. 1a, 1b, and 1c are a graphic presentation of the illumination technique used and results produced in the prior art.
Figure 1B:
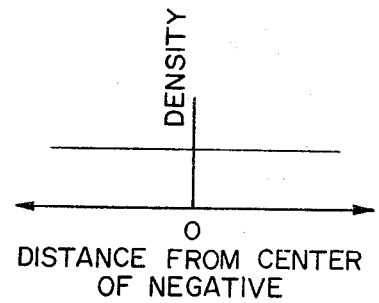
Figure 1C:
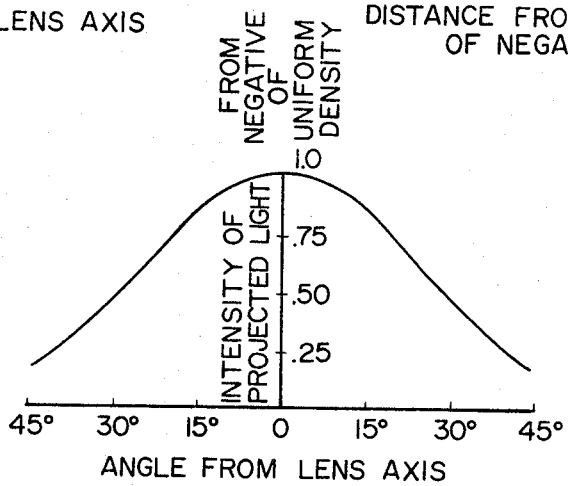

Referring now to FIG. 1 there is shown graphically, as known in the prior art, the effect of lighting a uniformly toned subject such as a grey sheet of paper more intensely at the periphery than at the center. FIG. 1a shows the intensity variation which is required to compensate for $\cos^4$ fall off in the camera lens to produce a uniform negative of FIG. 1b. FIG. 1c graphically represents the intensity of the projected image formed by a projection lens with $\cos^4$ fall off from a uniform density negative as it would appear at the surface of photosensitive print paper.

It should be understood that uniform density as used herein means the density which would be recorded from the uniformly toned object if reproduced by a system which had no $\cos^4$ law fall off, for example, a contact print device. Comparative density as discussed herein is of course with reference to a uniformly toned subject. An actual subject will have a variety of tones but the effect which is corrected by the present invention, i.e., off-axis lens fall off, is without regard to gradation.

As will be noted from FIG. 1c, the effect of lens fall off may be quite severe for half fields as small as 30° amounting to a 44 percent decrease in intensity from center to periphery.

With respect to FIG. 2 there is shown graphically the compensating effect of the instant invention. Two sets of curves represented by solid and dashed lines are illustrated, the solid curve denoting a subject uniformly illuminated and the dashed curve, a subject illuminated more intensely at the center than the periphery.

Figure 2A:
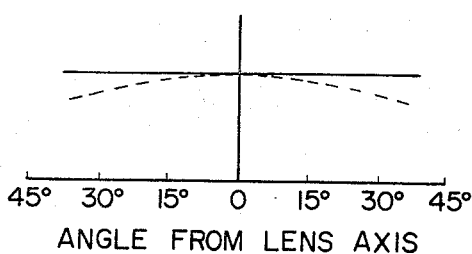
FIGS. 2a, 2b, and 2c are a similar presentation of the methods of the present invention.

FIG. 2a portrays the illumination intensity directed at a subject as in FIG. 1a. In preparing a negative for use with a projection lens having a field closely matched to the camera lens, uniform illumination as represented by the solid curve should be employed. The dashed line plots the intensity which would be used in photographing a negative for use with a projection lens of greater field and thus greater $\cos^4$ fall off than the camera lens.

Figure 2B:
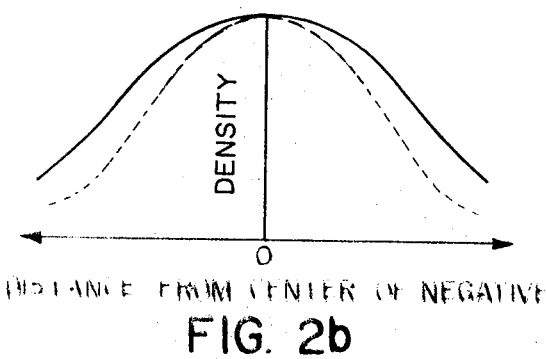

FIG. 2b illustrates the resulting density patterns on negatives formed by the camera lens as a result of $\cos^4$ fall off. The negative prepared from subjects illuminated by the dashed gradient intensity fall off in density somewhat faster than the ones prepared using uniform illuminating as represented by the solid gradient intensity in FIG. 2b.

Figure 2C:
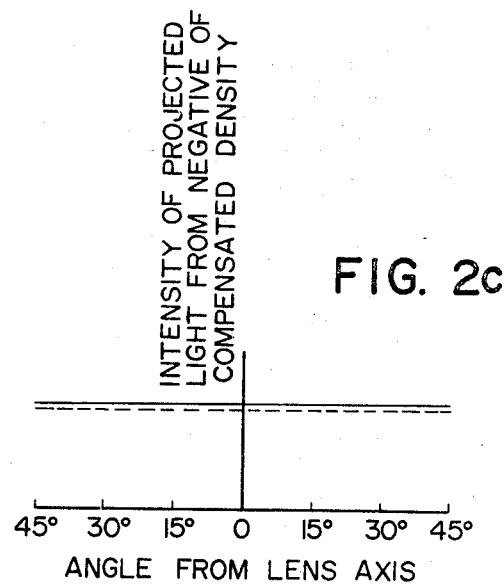

When projected back through a lens of similar or greater field than the camera lens, the increased transmittance at the periphery of the negative coupled with the fall off characteristic of the projection lens will yield a balanced field of illumination as shown in FIG. 2c.

As described above, this balanced field is the result when, for illustrative purposes, a subject of uniform tone is used. Since the subjects which are normally photographed and reproduced have a variety of tones, the curves illustrated above can be considered to have been plotted from a series of points on the subject at varying distances from the axis, all of these points having the same tone.

It will be appreciated that although some consideration should be given to the relative fields of the camera and projection lens in choosing the illumination gradient used in this method, the essential results, that is an improved uniform density print, do not require precise matching of the lens fields.

As will be obvious to one skilled in the art, preparation of negatives of the type described herein is not limited to a lens imaging camera system. For example, a pinhole camera could be used and the subject illuminated more strongly at the center than the periphery. In the same manner, a contact negative of this kind may be prepared from other negatives by illuminating the subject negative more intensely at the center.

The method disclosed is adaptable to the various photographic systems and should be considered as applicable to silver as well as non-silver image systems and to other portions of the electromagnetic spectrum than the visible.

What is claimed is:

1. In a process for preparing a blowback print the improvement comprising the steps of:
    (a) exposing a photosensitive material to a subject illuminated at least as intensely at the center as at less centralized portions thereof to form a photographic image having a greater density at the center than less centralized portions thereof; and
    (b) projecting an image of said photographic image upon an imaging surface through a lens exhibiting off-axis fall off characteristics.

2. In a photographic reproduction system, the method of preparing a photographic image having a greater density for an equal period of exposure at the center than at less centralized portions thereof, comprising in combination the steps of:
    (a) illuminating a subject to be reproduced at least as intensely at the center as at less centralized portions thereof;
    (b) projecting an image of said subject through a lens;
    (c) exposing photosensitive material to said image through said lens; and
    (d) developing said exposed material to produce said photographic image.

3. The method of claim 2 wherein said photographic image is a photographic negative.

4. The method of claim 2 wherein said subject is uniformly illuminated.

5. In a viewing system, the method of producing a viewable image of uniform density comprising in combination the steps of:
    (a) illuminating a subject to be reproduced at least as intensely at the center as at less centralized portions thereof;
    (b) projecting an image of said subject through a first lens;
    (c) exposing a first photosensitive material to said image through said first lens;
    (d) developing said exposed material to produce a photographic image having a greater density at the center than at less centralized portions thereof;
    (e) illuminating said photographic image; and
    (f) projecting an image of said photographic image through a second lens on an imaging surface to form said viewable image.

6. The method of claim 5 wherein said photographic image is a photographic negative.

7. The method of claim 6 including the steps of producing a photographic blowback print comprising:
    (a) exposing a second photosensitive material to said projected image of said photographic image through said second lens at said imaging surface; and
    (b) developing said exposed second photosensitive material to produce said photographic blowback print.

8. The method of claim 5 wherein said subject is uniformly illuminated.

9. The method of claim 5 wherein said lenses are wide angle lenses.

10. The method of claim 6 wherein said negative is a microfilm negative.

References Cited

UNITED STATES PATENTS

| | | | |
|---|---|---|---|
| 2,853,921 | 9/1958 | Biedermann et al. | 355—70 |
| 3,279,311 | 10/1966 | Lichtner | 355—71 |
| 3,375,752 | 4/1968 | Fairbanks et al. | 355—70 |

NORTON ANSHER, Primary Examiner

M. D. HARRIS, Assistant Examiner

U.S. Cl. X.R.

353—121